US012745197B2

(12) United States Patent
Sabouri-Sichani et al.

(10) Patent No.: US 12,745,197 B2
(45) Date of Patent: Sep. 22, 2026

(54) METHODS AND APPARATUSES FOR RADIO COMMUNICATION

(71) Applicant: Nokia Technologies Oy, Espoo (FI)

(72) Inventors: Faranaz Sabouri-Sichani, Aalborg (DK); Konstantinos Manolakis, Munich (DE); Lianghai Ji, Aalborg (DK); Simon Svendsen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 373 days.

(21) Appl. No.: 18/546,536

(22) PCT Filed: Mar. 5, 2021

(86) PCT No.: PCT/EP2021/055613

§ 371 (c)(1),
(2) Date: Aug. 15, 2023

(87) PCT Pub. No.: WO2022/184273

PCT Pub. Date: Sep. 9, 2022

(65) Prior Publication Data

US 2024/0188012 A1 Jun. 6, 2024

(51) Int. Cl.
*H04W 56/00* (2009.01)
*H04L 5/00* (2006.01)
(Continued)

(52) U.S. Cl.
CPC ....... *H04W 56/0015* (2013.01); *H04L 5/0051* (2013.01); *H04W 72/232* (2023.01); *H04W 92/18* (2013.01)

(58) Field of Classification Search
CPC ............ H04L 5/0051; H04W 56/0015; H04W 56/002; H04W 72/232; H04W 92/18
(Continued)

(56) References Cited

U.S. PATENT DOCUMENTS

2017/0289934 A1* 10/2017 Sheng ................. H04W 56/001
2018/0076984 A1 3/2018 Yang et al.
(Continued)

FOREIGN PATENT DOCUMENTS

WO 2020/069182 A1 4/2020
WO 2020/125989 A1 6/2020

OTHER PUBLICATIONS

"New WID on 5G V2X with NR sidelink", 3GPP TSG RAN Meeting #83, RP-190766, Agenda: 9.1.1, LG Electronics, Mar. 18-21, 2019, 8 pages.
"WID revision: NR sidelink enhancement", 3GPP TSG RAN Meeting #89e, RP-201516, Agenda: 9.8.3, LG Electronics, Sep. 14-18, 2020, 6 pages.
(Continued)

*Primary Examiner* — Robert J Lopata
(74) *Attorney, Agent, or Firm* — Robert P. Michal, Esq.; Rimon PC

(57) ABSTRACT

There is provided a method that comprises; deciding (214, 224), based on at least one first parameter characterizing a signal power associated with at least one received downlink reference signal (DRS #1, DRS #2) and based on at least one second parameter characterizing a signal power associated with at least one received sidelink reference signal (SRS #1, SRS #2), whether to transmit at least one sidelink synchronization signal (SLSS); and transmitting (216) the at least one sidelink synchronization signal (SLSS) if the decision indicates that the at least one sidelink synchronization signal (SLSS) is to be transmitted.

15 Claims, 6 Drawing Sheets

(51) Int. Cl.
*H04W 72/232* (2023.01)
*H04W 92/18* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2018/0234928 | A1* | 8/2018 | Yasukawa | H04W 92/18 |
| 2019/0312693 | A1* | 10/2019 | Belleschi | H04W 56/002 |
| 2019/0320429 | A1 | 10/2019 | Xue et al. | |
| 2020/0045660 | A1 | 2/2020 | Lee et al. | |
| 2022/0095257 | A1* | 3/2022 | Castaneda | H04W 56/0015 |
| 2023/0362851 | A1* | 11/2023 | Yang | H04W 56/0015 |
| 2024/0032076 | A1* | 1/2024 | Li | H04W 72/0453 |

OTHER PUBLICATIONS

"New WID on NR sidelink enhancement", 3GPP TSG RAN Meeting #86, RP-193231, Agenda: 9.1.1, LG Electronics, Dec. 9-12, 2019, 6 pages.
"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.
Yu Lien et al., "3GPP NR sidelink transmissions toward 5G V2X", IEEE Access, vol. 8, Feb. 13, 2020, pp. 35368-35382.
International Search Report and Written Opinion received for corresponding Patent Cooperation Treaty Application No. PCT/EP2021/055613, dated Dec. 6, 2021, 15 pages.
"Clarification for synchronization", 3GPP TSG-RAN WG2 Meeting #103, R2-1812768, LG Electronics Inc, Aug. 20-24, 2018, 7 pages.

* cited by examiner

METHODS AND APPARATUSES FOR RADIO COMMUNICATION

RELATED APPLICATION

This application claims priority to PCT Application No. PCT/EP2021/055613, filed on Mar. 5, 2021, which is incorporated herein by reference in its entirety.

FIELD OF THE INVENTION

There are provided advances in sidelink communication.

BACKGROUND

Sidelink (SL) has been developed to support advanced vehicle-to-anything (V2X) communications.

SUMMARY

An aspect of the description is directed to a method that comprises: deciding, based on at least one first parameter characterizing a signal power associated with at least one received downlink reference signal and based on at least one second parameter characterizing a signal power associated with at least one received sidelink reference signal, whether to transmit at least one sidelink synchronization signal; and transmitting the at least one sidelink synchronization signal if the decision indicates that the at least one sidelink synchronization signal is to be transmitted.

By taking into account the first and second parameters, in-coverage UEs align the transmission of the sidelink synchronization signal with each other. The sidelink coverage is improved and interference, in particular intra-cell and intra-cell interference, caused by sidelink synchronization signals is reduced.

Therefore, if an in-coverage UE fulfills the condition to transmit synchronization signal based on the measured RSRP from its serving eNB/gNB (i.e. the first condition), it will further evaluate received sidelink synchronization signals, S-RSRP, similar to out-of-coverage evaluation scheme as well before it decides on whether it should act as synchronization source by transmitting SLSS.

The transmitted SLSS will be measured by nearby sidelink UEs. If those SL-UEs the determined second parameter prevent them from transmitting SLSS, for example, if the measured second parameter lies above a configured threshold.

In other words, the provided solution will still provide the possibility for in-coverage UEs to act as synchronization source for UEs out of coverage when possible. The solution provides an enhanced decision, which enables efficient coverage extension and decreased inter- and intra-cell interference.

According to an advantageous example, the method comprises: receiving at least one downlink control information that causes the decision, whether to transmit the at least one sidelink synchronization signal. According to an example, the at least one downlink control information comprises an evaluation condition information that causes the decision, whether to transmit the at least one sidelink synchronization signal.

Advantageously, enabling and disabling the decision about the transmission of the sidelink synchronization signal is configurable per cell.

According to an advantageous example, the method comprises: not transmitting the at least one sidelink synchronization signal, if the decision indicates that the at least one sidelink synchronization signal shall not be transmitted.

According to an advantageous example, the method comprises: deciding to transmit the at least one sidelink synchronization signal if the at least one first parameter is determined to be below a first threshold and if the at least one second parameter is determined to be below a second threshold.

Advantageously, the threshold operations allow a technically effective determination of the transmit decision.

According to an advantageous example, the method comprises: receiving at least one downlink control information that indicates or represents at least one of or both the first threshold and second threshold.

Advantageously, the network is able to configure the second threshold according to the radio situation in the cell.

According to an advantageous example, the method comprises: selecting the at least one second parameter from a plurality of second parameters characterizing a respective signal power associated with a sidelink synchronization signal identifier that is associated with an in-coverage UE.

Therefore, the UE is able to consider a single in-coverage synchronization source, for example the SyncRef UE, for example with the highest reception power.

According to an advantageous example, the method comprises: adjusting, based on the at least one second parameter, a transmission power for the transmission of the at least one sidelink synchronization signal, especially to adjust the transmission power to a maximum allowed transmission power associated with the transmission of the sidelink synchronization signal (SLSS); and performing the transmitting of the at least one sidelink synchronization signal according to the determined transmission power.

Advantageously, the UE adapts its transmission power for the sidelink synchronization according to the received power of sidelink reference signals. For stronger reception power, the transmission power is reduced, and vice versa.

Therefore, interference is decreased while sidelink synchronization and coverage thereof is ameliorated.

According to an advantageous example, the method comprises: selecting, based on the at least one first parameter associated with at least one first spatial sector, at least one of a plurality of second spatial sectors different from the at least one first spatial sector; and perform the transmitting of the at least one sidelink synchronization signal in the selected at least one of the plurality of second spatial sectors.

Advantageously, the UE will refrain from transmitting the sidelink synchronization signal toward the gNB.

According to an advantageous example, the method comprises: disabling, upon the selection of the at least one of the plurality of second spatial sectors, measuring of the at least one first parameter, which is associated with the at least one first spatial sector, According to an advantageous example, the method comprises: disabling, upon the selection of the at least one of the plurality of second spatial sectors, measuring of the at least one second parameter, which is associated with the at least one first spatial sector.

By stopping the measuring or evaluation on the serving panel, i.e. when deciding to transmit from at least one of second spatial sectors, the UE will avoid to measure or evaluate the first and/or second parameter associated with the first spatial sector, as the first spatial sector is pointing to the gNB and not outside the gNB coverage.

According to an advantageous example, the selecting of the at least one of the plurality of second spatial sectors is performed, if the at least one first parameter, which is associated with the respective spatial sector, is determined to be below at least one first threshold.

According to an advantageous example, the selecting of the at least one of the plurality of second spatial sectors is performed, if the at least one second parameter associated with the respective spatial sector is determined to be below at least one second threshold.

According to an advantageous example, the method comprises: mapping, based on the first spatial sector, different first thresholds and/or different second thresholds to the plurality of second spatial sectors.

Advantageously, a threshold pattern comprising different threshold is applied to the spatial sectors. This threshold pattern allows to adapt the transmission of the sidelink synchronization signals in order to reduce interference on the cell boundary.

According to an advantageous example, the selecting comprises: identifying the first spatial sector associated with a received downlink reference signal; and selecting at least one of the plurality of second spatial sectors, if a relative numerical distance between the first parameter associated with the first spatial sector and the first parameter associated with the at least one second spatial sector exceeds a relative threshold.

According to a further aspect of the description, a method is provided that comprises: transmitting at least one downlink control information comprising at least one indicator, that causes a receiving UE, to decide, based on at least one first parameter characterizing a signal power associated with at least one received downlink reference signal and based on at least one second parameter characterizing a signal power associated with at least one received sidelink reference signal, whether to transmit at least one sidelink synchronization signal.

According to an advantageous example, the downlink control information comprises a first threshold and/or a second threshold, that causes the receiving UE to transmit the at least one sidelink synchronization signal if the at least one first parameter is determined to be below the first threshold and if the at least one second parameter is determined to be below a second threshold.

According to an advantageous example, the downlink control information comprises a relative threshold that causes the receiving UE to identify a first spatial sector associated with a received downlink reference signal; and to select at least one of a plurality of second spatial sectors, if a relative numerical distance between the first parameter associated with the at least one first spatial sector and the first parameter associated with the at least one second spatial sector exceeds the relative threshold.

Other aspects of the description are directed to apparatuses for radio communication.

In order to improve the understanding of the description of figures, the features are described with the same reference signs throughout the description of the figures.

DESCRIPTION OF THE EMBODIMENTS

Figure 1:
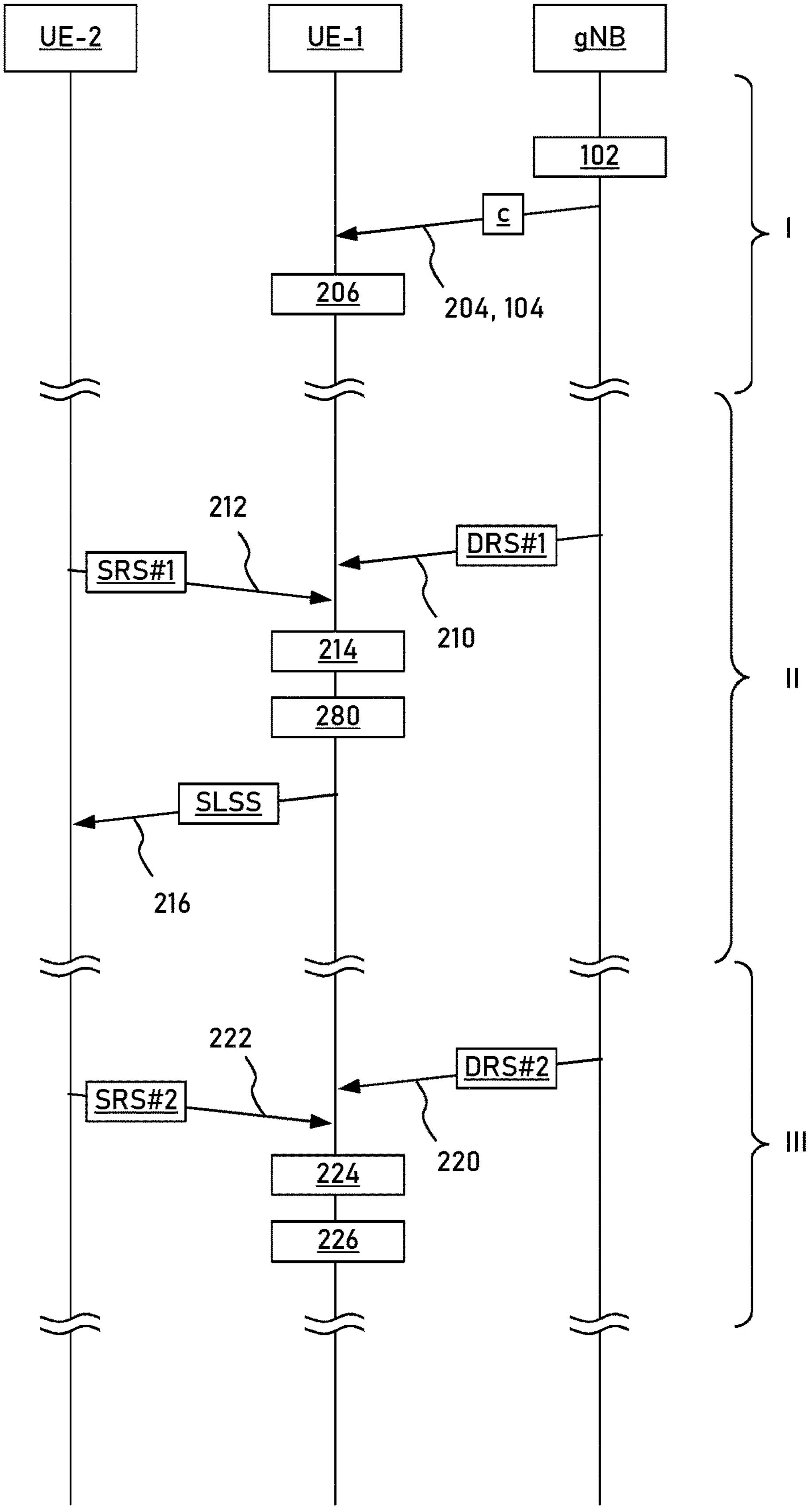
FIG. 1 depicts schematically a sequence diagram.

FIG. 1 depicts schematically a sequence diagram. In a configuration part I, an apparatus gNB provides the coverage of a cell. The apparatus gNB comprises determining or processing means 102 to determine a configuration information c. A transmitter or transmitting means 104 transmit the configuration information c to an apparatus UE-1, for example a radio terminal. The apparatus UE-1 comprises a receiver or receiving means 204 to receive the configuration information c.

Configuration or processing means 206 configure the apparatus UE-1 with parameters and conditions on when it should act as synchronization source for SL UEs. This configuration is done in the information element, SL-ConfigDedicatedNR, in an RRC message, RRCReconfiguration, and/or in a system information block, SIB. This configuration is in sl-SyncTxControl information element in a message RRCConnectionReconfiguration or RRCReconfiguration. gNB can configure UE-1 to transmit SLSS. In that case the configuration information c includes networkControlledSyncTx set to 'on or'off indicating UE-1 to transmit SLSS or not, respectively, without further evaluation.

The information element SL-ConfigDedicatedNR specifies the dedicated configuration information for NR sidelink communication:

```
-- ASN1START
-- TAG-SL-CONFIGDEDICATEDNR-START
SL-ConfigDedicatedNR-r16 ::=        SEQUENCE {
  ...
    networkControlledSyncTx-r16       ENUMERATED {on, off}
OPTIONAL,  --  ...
}
SL-DestinationIndex-r16 ::=             INTEGER (0..maxNrofSL-Dest-1-
r16)
-- TAG-SL-CONFIGDEDICATEDNR-STOP
-- ASN1STOP Need N
```

According to an example, a receiver or receiving means 204 of UE-1 receive the at least one downlink control information c that indicates or represents a first threshold, for example syncTxThreshIC, and a second threshold, for example syncTxThreshOoc or sl-syncTxThreshIC or another threshold to be used by in coverage UE's.

The transmitter or transmitting means 104 of gNB transmit at least one downlink control information c.

In a communication part II, III, UE-1 receives, via a receiver or receiving means 210, 220, at least one received downlink reference signal DRS #1, DRS #2 originating from gNB. UE-1 receives, via a receiver or receiving means 212, 222, at least one sidelink reference signal SRS #1, SRS #2 originating from an apparatus UE-2, for example another radio terminal.

UE-1 comprises deciding or processing means 214, 224, that determine based on at least one first parameter characterizing a signal power associated with the at least one received downlink reference signal DRS #1, DRS #2 and based on the at least one second parameter characterizing a signal power associated with at least one received sidelink reference signal SRS #1, SRS #2, whether to transmit at least one sidelink synchronization signal SLSS. Receiving 204 the at least one downlink control information c comprising an indicator networkControlledSyncTx that causes the deciding or processing means 214, 224 to decide or cause the decision, whether to transmit the at least one sidelink synchronization signal SLSS. In other words, the former indicator causes UE-1 to not only consider the first parameter but also the second parameter, for example by evaluating SRS #1, SRS #2 with second threshold, for deciding whether to transmit SLSS.

A transmitter or transmitting means 216 transmit the at least one sidelink synchronization signal SLSS if the decision indicates that the at least one sidelink synchronization signal SLSS is to be transmitted.

According to an example, SLSS is transmitted with a high transmit power, for example a maximum transmit power.

According to another example, gNB configures, via downlink control information c, a different allowed TX power in particular lower than the high transmit power, for example the maximum transmit power, i.e. a max allowed SLSS transmit power, MaxSyncTxPower, such that the intra- and inter-cell interference as well as overlapping coverage extension can be limited. This transmit power could be based on the measured S-RSRP.

Processing means 226 are provided omit transmitting the at least one sidelink synchronization signal SLSS, if the evaluation result of the decision indicates that the at least one sidelink synchronization signal SLSS shall not be transmitted.

Adjusting or processing means 280 adjust, based on the at least one second parameter, a transmission power for the transmission of the at least one sidelink synchronization signal SLSS. The transmitting, via the transmitter or transmitting means 216, of the at least one sidelink synchronization signal SLSS is performed according to the determined transmission power.

According to an example, the adjusting or processing means 280 adjust, based on the at least one second parameter, the transmission power for the transmission of the at least one sidelink synchronization signal SLSS to a high transmission power, for example the maximum transmit power that is associated with the transmission of the sidelink synchronization signal SLSS. According to an example, the maximum transmit power that is associated with the transmission of the sidelink synchronization signal SLSS is lower than a maximum allowed transmit power based on a maximum allowed cell power and UE's maximum transmission power capability.

From a perspective of gNB, the downlink control information c comprising at least one indicator networkControlledSyncTx causes the receiving in-coverage UE-1, to decide, based on the at least one first parameter characterizing a signal power associated with the at least one received downlink reference signal DRS #1, DRS #2 from the gNB and based on the at least one second parameter characterizing a signal power associated with at least one received sidelink reference signal SRS #1, SRS #2, whether to transmit the at least one sidelink synchronization signal SLSS.

According to an example, the downlink control information c comprises the first threshold, syncTxThreshIC, and/or the second threshold, syncTxThreshOoc or sl-syncTxThreshIC, that causes the receiving UE-1 to transmit the at least one sidelink synchronization signal SLSS if the at least one first parameter is determined to be below the first threshold, syncTxThreshIC, and if the at least one second parameter is determined 246 to be below the second threshold, syncTxThreshOoc or sl-syncTxThreshIC.

According to an example, the downlink control information c comprises a relative threshold, syncTxTreshRel, that causes the receiving UE-1 to identify a first spatial sector W associated with a received downlink reference signal DRS #1; and to select at least one of a plurality of second spatial sectors N, S, E, if a relative numerical distance between the first parameter associated with the at least one first spatial sector W and the first parameter associated with the at least one second spatial sector N, S, E exceeds the relative threshold syncTxTreshRel.

Figure 2:
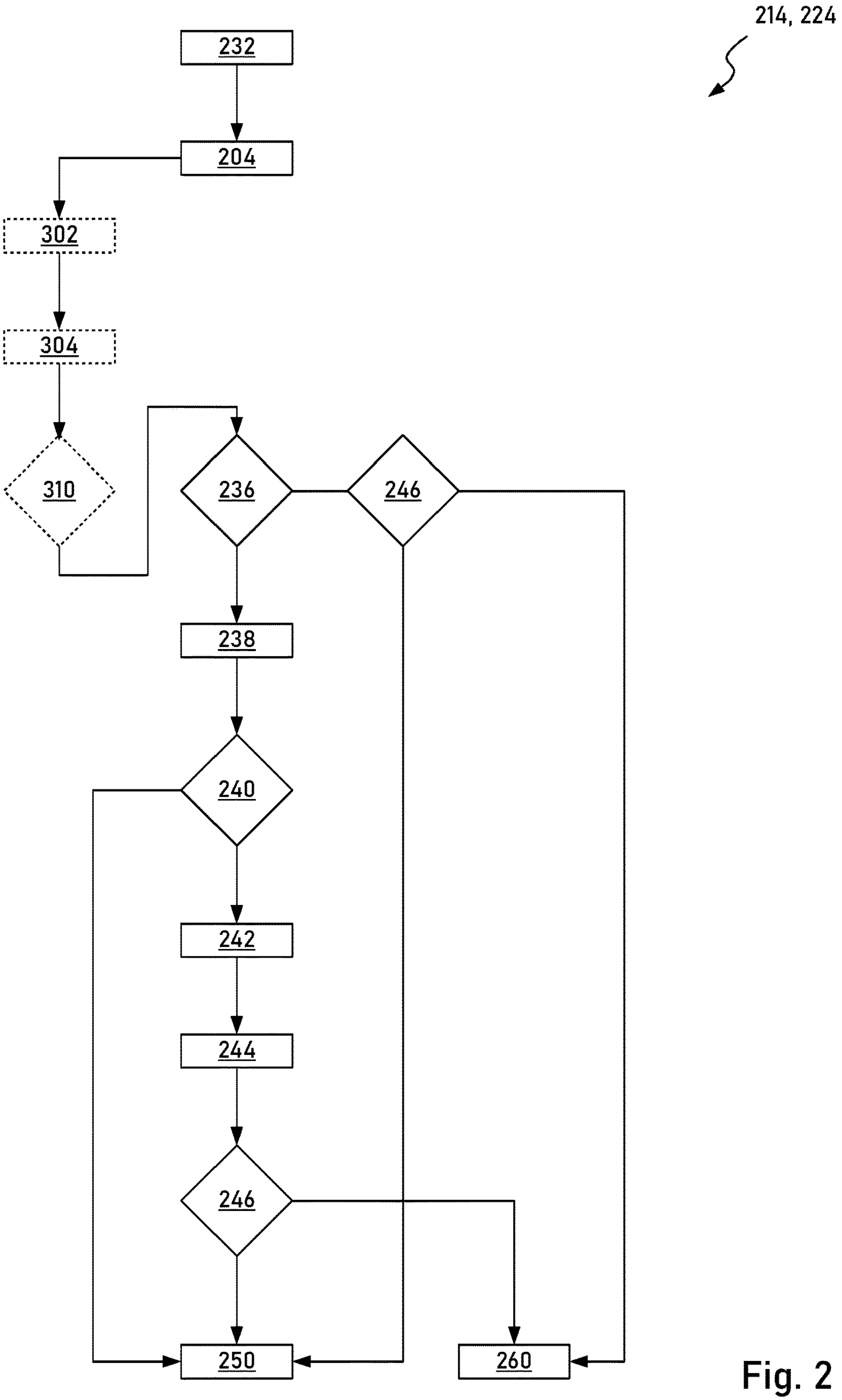
FIG. 2 depicts a schematic block diagram of a determining or processing means.

FIG. 2 depicts a schematic block diagram of the determining or processing means 214, 224 of FIG. 1.

Determining or processing means 232 determine that the apparatus UE-1 is in an in-coverage mode, that is, being served by gNB.

UE-1 is configured via receiver or receiving means 204, which receive the configuration c to which UE-1 is to obey. The dashed blocks are used, for example, for the case of multi-beam communication as exemplified afterwards in particular with respect to FIGS. 4 and 5 and can otherwise be skipped.

According to determining or processing means 236, UE-1 checks whether a downlink control information networkControlledSyncTx, indicating whether the respective control information is present, has been configured. Information element networkControlledSyncTx indicates whether gNB controls the transmission of the sidelink synchronization signals. If the affirmative, determining or processing means 236 decide to continue with determining or processing means 246.

If no downlink control information networkControlledSyncTx is configured, measuring or processing means 238 measure the first parameter characterizing the signal power associated with the at least one received downlink reference signal DRS #1, DRS #2.

In other words, if networkControlledSyncTx is not configured UE-1 compares the measured RSRP from its serving cell with the configured value provided as syncTxThreshIC in SL-SyncConfig information element. UE-1 will further evaluate measured sidelink synchronization signal RSRP values and identify SyncRef UE following the synchronization selection procedure for OoC UEs. If the measured S-RSRP from SyncRef UE is below syncTxThreshOoC or sl-syncTxThreshIC, the UE should transmit synchronization signal.

For example:

```
if (measured RSRP < syncTxThreshIC)
{         measure S-RSRP from UEs & determine SyncRef UE
          if (measured S-RSRP from identified syncRef <
          syncTxThreshOoC)
          {
            transmit SLSS
          }
}
```

Alternatively, gNB may configure a different threshold value than syncTxThreshOoC, e.g. sl-syncTxThreshIC to be used by in coverage UEs.

Determining or processing means 240 check whether the first parameter is above the first threshold, syncTxThreshIC. If affirmative, determining or processing means 250 determine that no SLSS is to be transmitted.

If the first parameter is below the first threshold, syncTxThreshIC, measuring or processing means 242 measure the at least one second parameter characterizing the signal power associated with the at least one received sidelink reference signal SRS #1, SRS #2.

Selecting or processing means 244 select the at least one second parameter from the plurality of second parameters determined via measuring or processing means 242. For example, the at least one second parameter is selected from the plurality of second parameters characterizing a respective signal power associated with a received sidelink synchronization signal, that is, for example, associated with an in-coverage UE.

Determining or processing means 246 check whether the at least one second parameter is above the second threshold, syncTxThreshOoc or sl-syncTxThreshIC. If the affirmative, the determining or processing means 250 decide to omit the transmission of the SLSS. If the second parameter is below the second threshold, the determining or processing means 260 determine to transmit the SLSS. Therefore, a second level measurement and comparison is added for an in-coverage UE upon decision to act as sidelink synchronization source.

The information element SL-SyncConfig specifies the configuration information concerning reception of synchronization signals from neighboring cells as well as concerning the transmission of synchronization signals for sidelink communication:

```
-- ASN1START
-- TAG-SL-SYNCCONFIG-START
SL-SyncConfigList-r16 ::=          SEQUENCE (SIZE (1..maxSL-SyncConfig-r16)) OF SL-SyncConfig-r16
SL-SyncConfig-r16 ::=              SEQUENCE {
  sl-SyncRefMinHyst-r16              ENUMERATED {dB0, dB3, dB6, dB9, dB12}          OPTIONAL,    -- Need N
  sl-SyncRefDiffHyst-r16             ENUMERATED {dB0, dB3, dB6, dB9, dB12, dBinf}   OPTIONAL,    -- Need N
  sl-filterCoefficient-r16           FilterCoefficient                              OPTIONAL,    -- Need N
  sl-SSB-TimeAllocation1-r16         SL-SSB-TimeAllocation-r16                      OPTIONAL,    -- Need N
  sl-SSB-TimeAllocation2-r16         SL-SSB-TimeAllocation-r16                      OPTIONAL,    -- Need N
  sl-SSID-r16                        INTEGER (0..671)                               OPTIONAL,    -- Need R
  txParameters-r16                   SEQUENCE {
    syncTxThreshIC-r16                 SL-RSRP-Range-r16                              OPTIONAL,  -- Need R
    new: sl-syncTxThreshIC-r16         SL-RSRP-Range-r16                              OPTIONAL,  -- Need R
    syncTxThreshOoC-r16                SL-RSRP-Range-r16                              OPTIONAL,  -- Need R
    syncInfoReserved-r16               BIT STRING (SIZE (2))                          OPTIONAL,  -- Need R
  },
  gnss-Sync-r16                      ENUMERATED {true}                                OPTIONAL,  -- Need R
...
}
SL-RSRP-Range-r16 ::=                INTEGER (0..13)
SL-SSB-TimeAllocation-r16 ::=        SEQUENCE {
  sl-NumSSB-WithinPeriod-r16         ENUMERATED {n1, n2, n4, n5, n16, n32, n64}       OPTIONAL,    -- Need R
  sl-TimeOffsetSSB-r16               INTEGER (0..1279)                                OPTIONAL,    -- Need R
  sl-TimeInterval-r16                INTEGER (0..639)                                 OPTIONAL     -- Need R
}
-- TAG-SL-SYNCCONFIG-STOP
-- ASN1STOP
```

In summary, the deciding or processing means 214 decide to transmit the at least one sidelink synchronization signal SLSS if the at least one first parameter, determined via determining or processing means 240, is below a first threshold, syncTxThreshIC, and if the at least one second parameter, determined via determining or processing means 246, is below a second threshold, syncTxThreshOoc or sl-syncTxThreshIC.

On the other hand, the UE decides via the deciding or processing means 224 to omit the transmission of the at least one sidelink synchronization signal SLSS if the at least one first parameter is determined 240 to be above the first threshold, syncTxThreshIC, or if the at least one second parameter is determined 248 to be above the second threshold, syncTxThreshOoc or sl-syncTxThreshIC.

Figure 3:
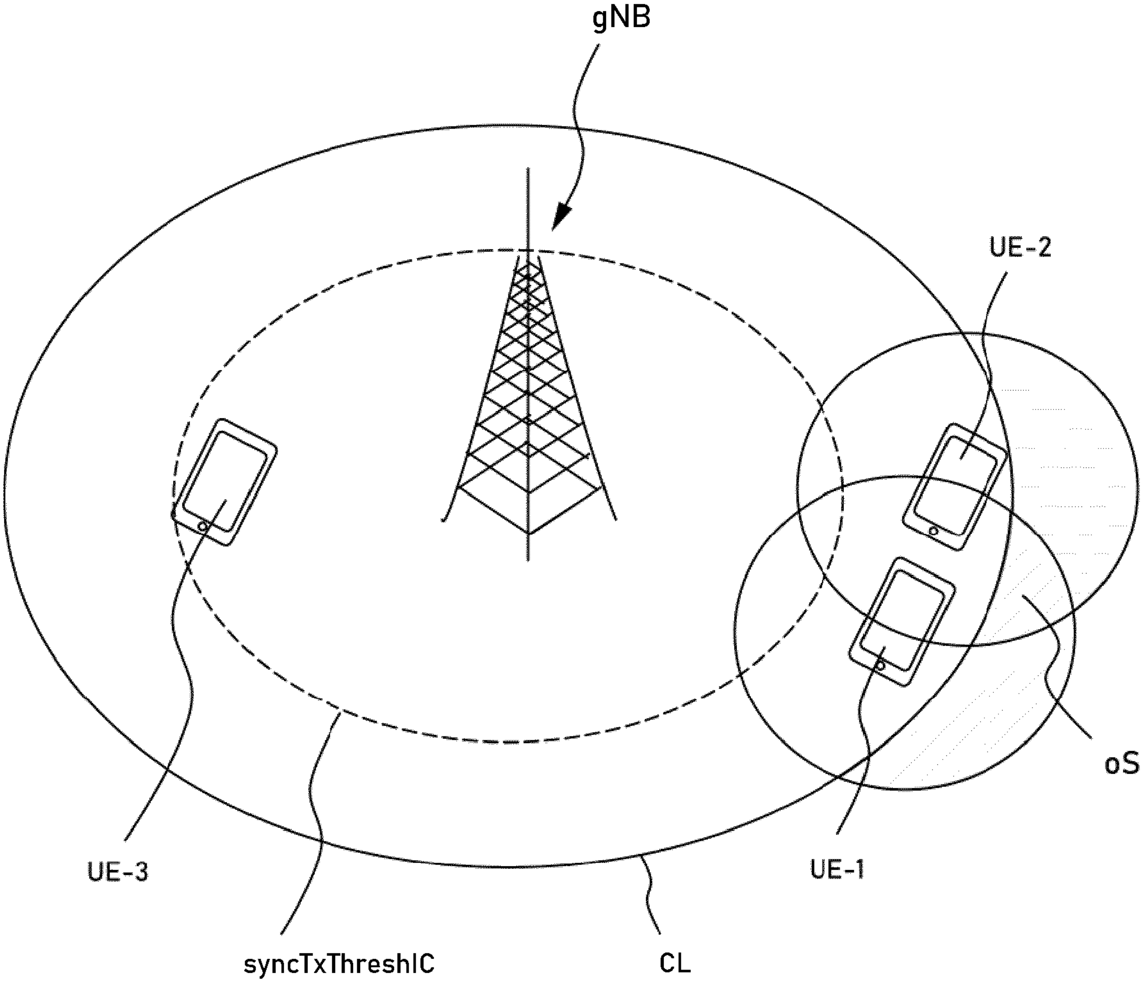
FIGS. 3 and 5 each depict schematically a cellular radio communications network.

For explaining a multi-beam/multi-panel example, the description refers to four spatial sectors N, S, W, 0, which are bound to the UE-1 and which change with the translation and rotation of UE-1, cf. FIG. 3.

Selecting or processing means 310 select, based on at least one first spatial sector W associated with a received downlink reference signal DRS #1 and/or based on the at least one first parameter associated with the at least one first spatial sector W, at least one of a plurality of second spatial sectors N, S, E that is different from the at least one first spatial sector W.

The transmitter or transmitting means 216 perform the transmission of the at least one sidelink synchronization signal SLSS in the selected at least one of the plurality of second spatial sectors N, S, E.

The first spatial sector W is associated with a direction from where the downlink reference signal DRS #1 originates.

According to an example, the at least one second spatial sector E faces away from the first spatial sector W.

The selection or processing means 310 is present if multi panel/multi-beam operation is available and enabled for the UE. If affirmative, the UE-1 provides the decision whether to transmit or not, according to decision or processing means 250, 260, sector-wise. The respective spatial sector determined to be transmitted via decision or processing means 260 is selected via the selection or processing means 310, wherein the sidelink synchronization signal SLSS is transmitted via the selected second spatial sectors. A transmission in the first spatial sector W and not-selected spatial sectors is omitted.

According to an example, UE-1 will stop power measurement associated with the downlink reference signal in the first spatial sector.

Identifying or processing means 302 determine the first sector W that is associated with a stronger reception power in comparison with the spatial sectors N, S, E. For example, the first or primary spatial sector W is the spatial sector with the strongest received power of the downlink reference signal from the gNB. The identifying or processing means 302 identify the first spatial sector W associated with a received downlink reference signal DRS #1.

According to an example, the selecting or processing means 310 perform a selection of the at least one of the plurality of second spatial sectors N, S, E is performed, if the at least one first parameter, which is associated with the respective spatial sector N, S, E, is determined 240 to be below at least one first threshold, syncTxThreshIC.

According to an example, the selecting or processing means 310 perform a selection of the at least one of the plurality of second spatial sectors N, S, E is performed, if the at least one second parameter associated with the respective spatial sector N, S, E is determined 246 to be below at least one second threshold, SyncTxThreshOoC or syncTxThreshIC.

According to an example, measuring means 238, 242 for measuring the at least one first parameter and the at least one second parameter, which are associated with the at least one first spatial sector (W), are disabled. In other words, the panel of UE-1 which is directed towards the gNB does not provide measurements for the first and second parameter.

Mapping or processing means 304 map, based on the identity or position of the first spatial sector W, different first thresholds, syncTxThreshIC, and/or different second thresholds, syncTxThreshOoc or sl-syncTxThreshIC, to the plurality of second spatial sectors N, S, E. For example, the first and/or second threshold decrease as a direction of a spatial, for example radial, vector of the associated second spatial sector points away from the direction associated with the gNB or the strongest power associated with the first or second parameter. According to an example, the SL-syncConfig includes panel-specific thresholds, syncTxThreshIC and syncTxThreshOoC or sl-syncTxThreshIC, considering the higher gain achieved by beam/panel-based transmission configuration.

The selecting or processing means 310 select at least one of the plurality of second spatial sectors N, S that are adjacent to the primary spatial sector W, if a relative numerical distance between the first parameter associated with the first spatial sector W and the first parameter associated with the at least one second spatial sector N, S, E exceeds a relative threshold syncTxTreshRel. For example, if the measured RSRP levels from the gNB at two adjacent panels are within for example 3 dB, then that is an indication that those two panels both partly are directed towards that gNB. If the UE is located at the border of where it is allowed to transmit SLSS, one panel might have an RSRP level above syncTxThreshIC and the further panel has an RSRP level below syncTxThreshIC. Adding the relative threshold syncTxThreshRel of for example 3 dB, will ensure that the further panel is orientated further away from the direction of the gNB before the UE starts transmitting SLSS on the further panel.

In other words, the in-coverage UE-1 measures RSRP on the available panels and determines which of the panels receives RSRP values below the respective configured specified threshold (for example at least one of the following: syncTxThreshIC, syncTxThreshOoC, or sl-syncTxThreshIC). In particular, syncTxThreshIC threshold is used to evaluate measured DRS while TxThreshOoC or sl-syncTxThreshIC thresholds are used to evaluate measured SRS. However, UE-1 will start transmitting SL synchronization signals on the panels where the RSRP level from the same source is also below the relative level threshold syncTxThreshRel of a strong, for example the strongest, measured RSRP level from a respective source. As UE-1 can be oriented in a way where two panels can receive strong RSRP levels from the respective source, the measured RSRP level on the first panel is above the threshold and will not transmit SL synchronization signals, while the measured RSRP level on the second panel could be below the threshold and would therefore be configured for transmitting SL synchronization signals. However, since both panels are partly oriented towards the gNB (small difference between the measured RSRP levels) it is beneficial if the second panel does not transmit SL synchronization signals even though it is below the respective threshold (for example syncTxThreshIC, syncTxThreshOoC, or the new sl-syncTxThreshIC). Adding the relative threshold syncTxThreshRel will prevent that.

FIG. 3 depicts schematically a cellular radio communications network. All three UE-1 to UE-3 are in coverage of the cell CL. UE-3 determines that its measured RSRP from gNB is above the first threshold, syncTxThreshIC, and will not transmit SLSS.

UE-1 and UE-2 determine that their first parameter is below the first threshold, syncTxThreshIC, and may transmit SLSS. Moreover, UE-2 is in the vicinity of UE-1, so that both UE-1 and UE-2 could reach each other through sidelink communication. According to the procedure outlined to FIG. 2, at least UE-1 determines that its second parameter, indicating a reception of SLSS from UE-2, is above the corresponding second threshold and UE-1 will omit or adjust a directivity/the spatial sector of the transmission of SLSS. Therefore, interference of SLSSs from both UE-1 and UE-2 can be reduced in an overlapping section OS.

Figure 4:
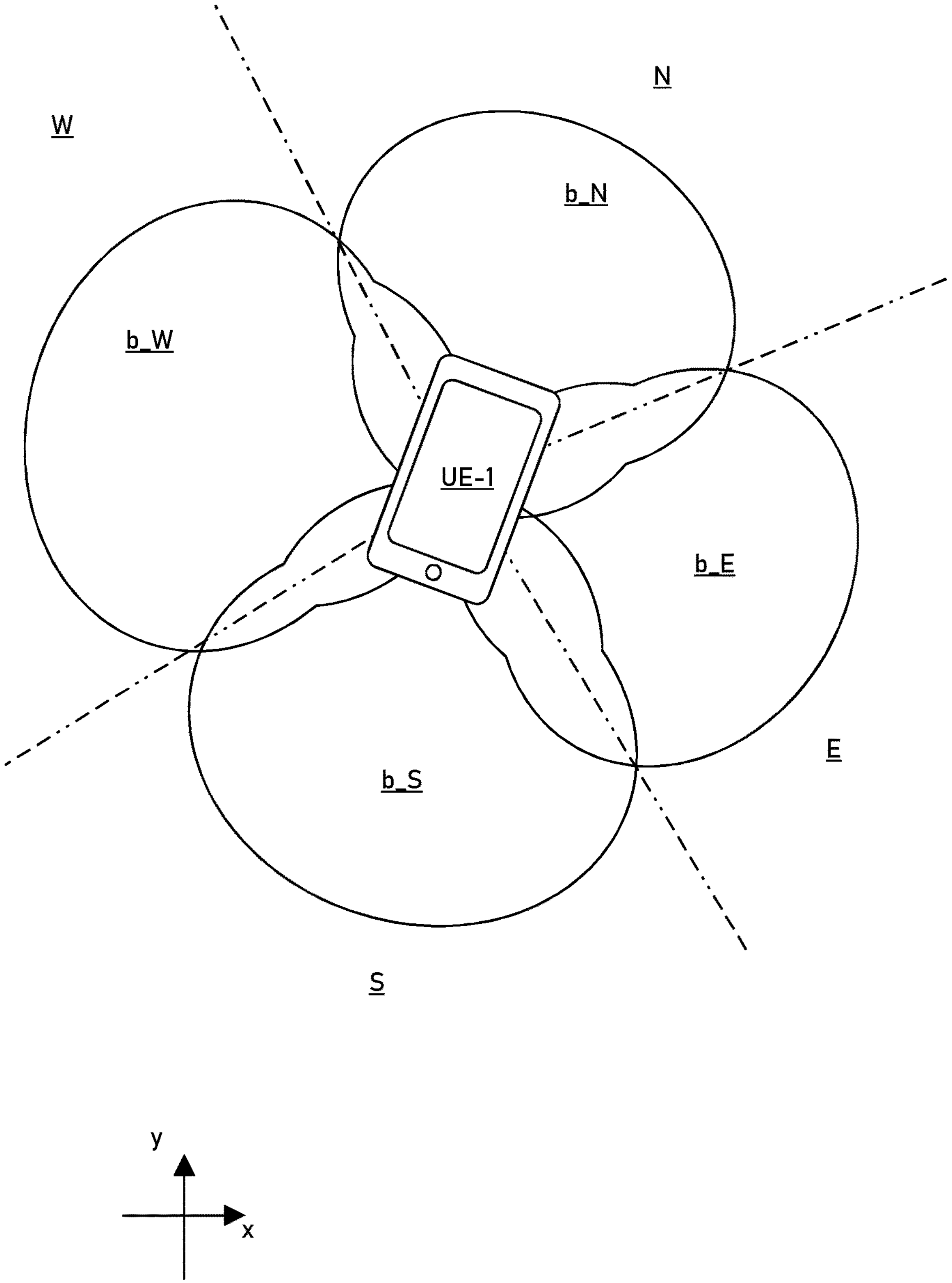
FIG. 4 depicts schematically an apparatus and its local view with respect to spatial sectors.

FIG. 4 depicts schematically the apparatus UE-1 and the local view of its associated spatial sectors N, S, W, E. The spatial sectors are fixed with respect to UE-1. UE-1 translates and rotates with respect to a spatial coordinate system xy. For example, the spatial sector N, S, W, E is associated with a respective reception and/or transmission beam b_N, b_S, b_W, b_E. For example, the spatial sector N, S, W, E is associated with a respective reception and/or transmission panel of UE-1.

To attend the different panels of UE-1, the relative threshold as described with respect to FIG. 2, in particular with respect to determining or processing means 246, is used. In the following, a motivation for using the relative threshold is provided.

As per 3GPP release 15, the frequency bands which are allocated for Next Radio (NR) are designated for different frequency ranges (FR), FR1 (410 MHz-7125 MHz) and FR2 (24250 MHz-52600 MHz). The path loss of high frequency mm wavelengths in FR2 and above is increased and further attenuation is caused by buildings, rain, and plants; hence, beam forming—even with multiple panels—is also used at the UE side besides the node B (NB) side. As a result, the UE/UE-1 can transmit to controlled directions in SL by transmitting from a (wide) beam on a given panel. As the shown example, the UE-1 with four panels can cover different directional lobes when transmitting with its four panels.

According to an example, MPUEs as UE-1 evaluate the RSRP for the available panels. Hence, the highest measured serving cell RSRP is considered the one measured by the panel/beam pointing to the gNB. This panel is called the serving panel. The UE will probably not measure high RSRP value from further panels.

According to an example, in-coverage UE-1 transmits SLSS on a panel facing the opposite direction than the panel receiving a strong, for example the strongest, RSRP signal from the gNB, i.e. the serving panel. For example, UE-1's serving panel is associated with sector W, hence, it is allowed to transmit synchronization signal from the panel associated with sector S, referring to FIG. 5. If UE-1 has three available panels (i.e. it has no panel associated with sector S), it will not be allowed to transmit SLSS. But if UE-1 rotates and starts to receive the strong for example the strongest, RSRP from the gNB on a panel for example from the panel associated with sector W it may start transmitting SL synchronization signals on panel associated with sector E.

Figure 5:
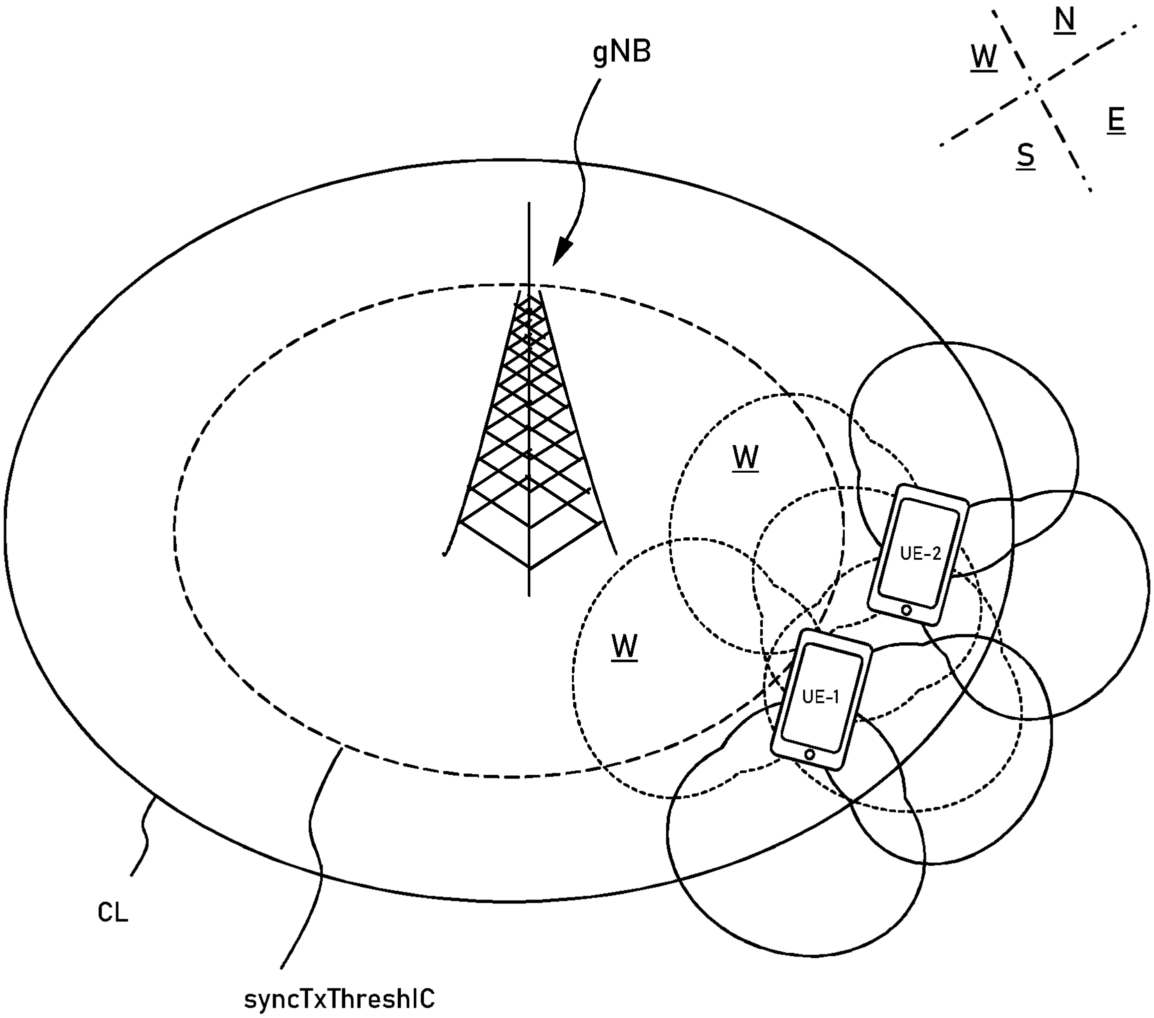

FIG. 5 depicts schematically the cellular radio communications network. Both UE-1 and UE-2 coordinate the transmission of SLSS in accordance with the available spatial sectors N, S, W, E. In particular, UE-1 and UE-2 omit transmission of SLSS in the spatial sectors indicated by dotted lines, but transmit SLSS in the spatial sectors indicated by solid lines. For more examples, reference is made to the description of FIG. 2.

According to an example, adopted to FR2, no transmission from the UE's serving panel is performed without further evaluation as this signal would point to the center of the cell and cannot extend the coverage. That is, UE-1 and UE2 omit to transmit SLSS toward gNB in the respective spatial sector W.

Figure 6:
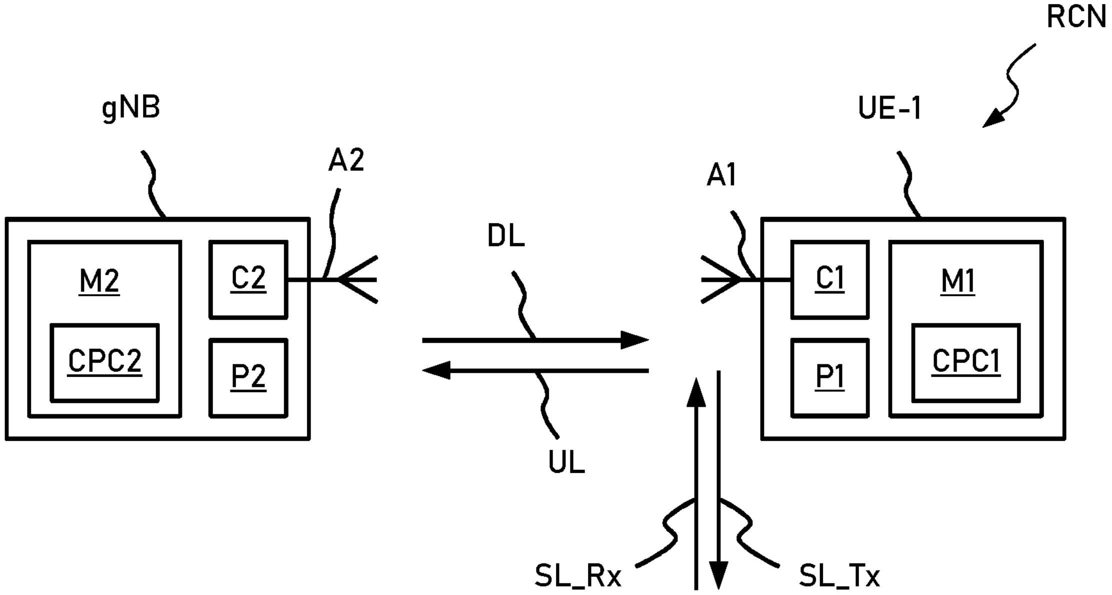
FIG. 6 depicts schematically two apparatuses.

FIG. 6 depicts schematically a radio communications network RCN. The first apparatus UE-1 comprises at least one processor P1, at least one memory M1 including computer program code CPC1, and at least one communication module C1 that is coupled with at least one antenna A1. The at least one memory M1 and computer program code CPC1 are configured, with the at least one processor P1, and the at least one communication module C1, to cause the first apparatus UE-1 at least to operate according to the present description. The second apparatus 200 comprises at least one processor P2, at least one memory M2 including computer program code CPC2, and at least one communication module C2 that is coupled with at least one antenna A2. The at least one memory M2 and computer program code CPC2 are configured, with the at least one processor P2, and the at least one communication module C2, to cause the second apparatus gNB at least to operate according to the present description. The first apparatus UE-1 transmits signals in a first direction UL, for example an upload direction, to the second apparatus gNB. The second apparatus gNB transmits signals in a second direction DL, for example a download direction to the first apparatus UE-1. The first apparatus UE-1 further transmits signals in a third direction SL_Tx, for example a sidelink direction, to another first apparatus. The first apparatus UE-1 further receives signals in a fourth direction SL Rx, for example another sidelink direction, from another first apparatus.

According to an example the radio communications network RCN is a cellular radio communications network. The first direction UL is an uplink direction. The second direction DL is a downlink direction. The first apparatus UE-1 is a radio terminal. The second apparatus gNB is a base station.

Abbreviations used in this description comprise:

eNB: Evolved Node B
FR: Frequency Range
IE: Information Element
gNB: Next Generation eNB
MPUE: Multi-Panel UE
NR: New Radio
OoC: Out of Coverage
RRC: Radio Resource Control
RSRP: Reference Signal Received Power
SCI: Sidelink Control Information
SL: SideLink
SLSS: SL Synchronization Signal
S-PSS: Sidelink Primary Synchronization Signal
S-RSRP: Sidelink Reference Signal Received Power
S-SSS: Sidelink Secondary Synchronization Signal
SPBCH: Physical Sidelink Broadcast Channel
UE: User equipment Even though the invention has been described above with reference to an example according to the accompanying drawings, the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways. Therefore the names used throughout the description for configurations and information elements are not limiting.

The invention claimed is:

1. A first apparatus comprising at least one processor, at least one memory including computer program code, and at least one communication module, the at least one memory and computer program code configured, with the at least one processor, and the at least one communication module, to cause the first apparatus at least to:

determine, in response to receiving at least one downlink control information, whether to transmit at least one sidelink synchronization signal based on (i) at least one first parameter characterizing a signal power associated with at least one received downlink reference signal and (ii) at least one second parameter characterizing a signal power associated with at least one received sidelink reference; and transmit the at least one sidelink synchronization signal responsive to determining that the at least one sidelink synchronization signal is to be transmitted.

2. The apparatus according to claim 1 being further configured to:

prevent transmission of the at least one sidelink synchronization signal, responsive to the decision indicating that the at least one sidelink synchronization signal shall not be transmitted.

3. The apparatus according to claim 1 being further configured to:

determine to transmit the at least one sidelink synchronization signal responsive to determining the at least one first parameter is below a first threshold and if the at least one second parameter is determined to be below a second threshold.

4. The apparatus according to claim 3 being further configured to:

receive at least one control information that indicates or represents at least one of or both the first threshold and second threshold.

5. The apparatus according to claim 1 being further configured to:

select the at least one second parameter from a plurality of second parameters characterizing a respective signal power associated with a sidelink synchronization signal.

6. The apparatus according to claim 1 being further configured to:

adjust, based on the at least one second parameter, a transmission power for the transmission of the at least one sidelink synchronization signal, especially to adjust the transmission power to a maximum allowed transmission power associated with the transmission of the sidelink synchronization signal; and perform the transmission of the at least one sidelink synchronization signal according to the determined transmission power.

7. The apparatus according to claim 1 being further configured to:

select, based on the at least one first parameter associated with at least one first spatial sector, at least one of a plurality of second spatial sectors different from the at least one first spatial sector; and perform the transmission of the at least one sidelink synchronization signal in the selected at least one of the plurality of second spatial sectors.

8. The apparatus according to claim 7, wherein the selection of the at least one of the plurality of second spatial sectors is performed, responsive to determining the at least one first parameter, which is associated with the respective spatial sector, is below at least one first threshold.

9. The apparatus according to claim 7, wherein the selection of the at least one of the plurality of second spatial sectors is performed, responsive to determining that the at least one second parameter associated with the respective spatial sector is below at least one second threshold.

10. The apparatus according to claim 7 being further configured to: map, based on the first spatial sector, different first thresholds and to the plurality of second spatial sectors.

11. The apparatus according to claim 7 being further configured to: map, based on the first spatial sector, different second thresholds to the plurality of second spatial sectors.

12. The apparatus according to claim 7 being further configured to: identify the first spatial sector associated with a received downlink reference signal; and select at least one of the plurality of second spatial sectors, responsive to a relative numerical distance between the first parameter associated with the first spatial sector and the first parameter associated with the at least one second spatial sector exceeding a relative threshold.

13. A method comprising:

determining, in response to receiving at least one downlink control information, whether to transmit at least one sidelink synchronization signal based on (i) at least one first parameter characterizing a signal power associated with at least one received downlink reference signal and (ii) at least one second parameter characterizing a signal power associated with at least one received sidelink reference signal; and transmitting the at least one sidelink synchronization signal responsive to the decision indicating that the at least one sidelink synchronization signal is to be transmitted.

14. The method according to claim 13 further comprising:

preventing transmission of the at least one sidelink synchronization signal, responsive to the decision indicating that the at least one sidelink synchronization signal shall not be transmitted.

15. The method according to claim 13 further comprising:

determining to transmit the at least one sidelink synchronization signal if the at least one first parameter is determined to be below a first threshold and if the at least one second parameter is determined to be below a second threshold.

* * * * *